United States Patent
Liu et al.

(10) Patent No.: US 10,778,381 B2
(45) Date of Patent: Sep. 15, 2020

(54) METHOD AND USER EQUIPMENT FOR COMPACTING HARQ FEEDBACK

(71) Applicant: Telefonaktiebolaget LM Ericsson (publ), Stockholm (SE)

(72) Inventors: Jinhua Liu, Beijing (CN); Shaohua Li, Beijing (CN); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 14/907,518

(22) PCT Filed: Jan. 18, 2016

(86) PCT No.: PCT/CN2016/071183
§ 371 (c)(1),
(2) Date: Jan. 25, 2016

(87) PCT Pub. No.: WO2016/161833
PCT Pub. Date: Oct. 13, 2016

(65) Prior Publication Data
US 2017/0117991 A1   Apr. 27, 2017

(30) Foreign Application Priority Data
Apr. 10, 2015   (WO) ................ PCT/CN2015/076317

(51) Int. Cl.
*H04L 1/18* (2006.01)
*H04L 1/16* (2006.01)
(Continued)

(52) U.S. Cl.
CPC .......... *H04L 1/1887* (2013.01); *H04L 1/0006* (2013.01); *H04L 1/1664* (2013.01);
(Continued)

(58) Field of Classification Search
CPC .... H04L 1/1887; H04L 1/0006; H04W 24/10; H04W 72/0486
See application file for complete search history.

(56) References Cited

U.S. PATENT DOCUMENTS

| 7,966,541 B2 | 6/2011 | Fan et al. |
| 8,184,591 B2 | 5/2012 | Pani et al. |
| (Continued) | | |

FOREIGN PATENT DOCUMENTS

| CN | 102223219 A | 10/2011 |
| CN | 102823180 A | 12/2012 |
| (Continued) | | |

OTHER PUBLICATIONS

International Search Report and Written Opinion for Application No. PCT/CN2016/071183, dated Apr. 11, 2016, 12 pages.
(Continued)

*Primary Examiner* — Kodzovi Acolatse
*Assistant Examiner* — Jay L Vogel
(74) *Attorney, Agent, or Firm* — NDWE LLP

(57) ABSTRACT

A method and apparatus for operating in a User Equipment (UE) for compacting HARQ feedback transmission in uplink in a wireless communication system. The UE receives, from a radio network node, an assisting information indicating arrangement of scheduled downlink transmissions. The UE determines, based on the assisting information, number and order of the HARQ feedback bits. The UE then transmits, to the radio network node, HARQ feedback in a compacted manner of reduced padding bits based on the number and order of the HARQ feedback bits.

16 Claims, 10 Drawing Sheets

(51) Int. Cl.
*H04L 1/00* (2006.01)
*H04W 24/10* (2009.01)
*H04W 72/04* (2009.01)

(52) U.S. Cl.
CPC .......... *H04L 1/1864* (2013.01); *H04W 24/10* (2013.01); *H04W 72/0486* (2013.01); *H04L 1/0002* (2013.01); *H04L 1/0073* (2013.01)

(56) References Cited

U.S. PATENT DOCUMENTS

| | | | | |
|---|---|---|---|---|
| 2004/0081113 | A1* | 4/2004 | Earnshaw | H04J 11/0023 370/320 |
| 2005/0041746 | A1* | 2/2005 | Rosen | H04B 1/7163 375/242 |
| 2009/0279460 | A1* | 11/2009 | Sarkar | H04L 1/16 370/280 |
| 2011/0142025 | A1* | 6/2011 | Agee | H04B 7/0413 370/342 |
| 2011/0243066 | A1* | 10/2011 | Nayeb Nazar | H04L 1/007 370/328 |
| 2011/0310820 | A1 | 12/2011 | Liao et al. | |
| 2012/0039227 | A1* | 2/2012 | Chen | H04L 1/0015 370/311 |
| 2012/0039279 | A1* | 2/2012 | Chen | H04L 5/0055 370/329 |
| 2012/0039280 | A1 | 2/2012 | Chen et al. | |
| 2012/0327885 | A1* | 12/2012 | Chung | H04L 1/1614 370/329 |
| 2013/0170407 | A1 | 7/2013 | Liang et al. | |
| 2013/0322391 | A1* | 12/2013 | Yang | H04L 5/001 370/329 |
| 2014/0192738 | A1* | 7/2014 | Nam | H04L 5/001 370/329 |
| 2014/0334351 | A1* | 11/2014 | Yin | H04L 5/14 370/280 |
| 2014/0362797 | A1* | 12/2014 | Aiba | H04L 1/0026 370/329 |
| 2015/0264678 | A1* | 9/2015 | Yin | H04W 52/22 370/329 |
| 2018/0027547 | A1* | 1/2018 | Lyu | H04W 72/048 |

FOREIGN PATENT DOCUMENTS

| | | |
|---|---|---|
| CN | 102904698 A | 1/2013 |
| CN | 103119884 A | 5/2013 |
| CN | 103297208 A | 9/2013 |
| CN | 103580827 A | 2/2014 |
| EP | 2378828 A1 | 10/2011 |
| JP | 2013531941 A | 8/2013 |
| JP | 2013534392 A | 9/2013 |
| RU | 2384962 C2 | 3/2010 |
| RU | 2392752 C2 | 6/2010 |
| WO | 2009116754 A2 | 9/2009 |
| WO | 2010144245 A1 | 12/2010 |
| WO | 2011044170 A1 | 4/2011 |
| WO | 2012024222 A2 | 2/2012 |
| WO | 2012064935 A1 | 5/2012 |
| WO | 2012171413 A1 | 12/2012 |
| WO | 2014/077607 A1 | 5/2014 |

OTHER PUBLICATIONS

International Preliminary Report on Patentability for Application No. PCT/CN2016/071183, dated Aug. 2, 2017, 13 pages.

Office Action from foreign counterpart Vietnam Patent Application No. 1-2017-03920, dated Dec. 21, 2017, 1 page. (English translation only available).

First Office Action and Search Report from foreign counterpart Canadian Patent Application No. 2982198, dated Aug. 28, 2018, 4 pages.

First Office Action and Search Report from foreign counterpart Russian Patent Application No. 2017134492, dated Aug. 30, 2018, 14 pages.

Extended European Search Report for Application No. 16776009.9, dated Oct. 9, 2018, 10 pages.

Huawei., et al., "On CA enhancements supporting upto 32 component carriers," 3GPP TSG-RAN WG1 Meeting #80, R1-150390, Athens, Greece, Feb. 9-13, 2015, 9 pages.

LG Electronics, "HARQ-ACK transmission for supporting CA of up to 32 carriers," 3GPP TSG-RAN WG1 Meeting #80, R1-150209, Agenda item 7.2.2.3, Athens, Greece, Feb. 9-13, 2015, 5 pages.

Office Action from foreign counterpart Japanese Patent Application No. 2017-552988, dated Oct. 19, 2018, 6 pages.

Office Action from foreign counterpart Chile Patent Application No. 20170002525, dated Dec. 17, 2018, 13 pages.

First Office Action from foreign counterpart Mexican Patent Application No. MX/a/2017/012585, dated May 28, 2019, 3 pages.

Final rejection from foreign counterpart Japanese Patent Application No. 2017-552988, dated Feb. 22, 2019, 7 pages.

Notice of Preliminary Rejection from foreign counterpart Korean Patent Application No. 10-2017-7027726, dated Feb. 28, 2019, 8 pages.

Office Action, ID App. No. P00201706118, dated Nov. 5, 2019, 4 pages.

Notice of Allowance from foreign counterpart Mexican Patent Application No. MX/a/2017/012585, dated Jul. 26, 2019, 2 pages.

Office Action from foreign counterpart Chile Patent Application No. 20170002525, dated Jun. 6, 2019, 10 pages.

Reconsideration Report by Examiner before Appeal from foreign counterpart Japanese Patent Application No. 2017-552988, dated Jul. 12, 2019, 6 pages.

Office Action, EG App. No. 2017091501, dated Jan. 10, 2020, 5 pages (1 page of Partial Translation and 4 pages of Original Document).

Office Action, CA App. No. 2982198, dated Oct. 9, 2019, 4 pages.

First Office Action, CN App. No. 201680021135.3, dated Dec. 18, 2019, 13 pages (8 pages of English Translation and 5 pages of Original Document).

Grant of Patent, KR App. No. 10-2017-7027726, dated Sep. 11, 2019, 2 pages (1 page of English Translation and 1 page of Original Document).

Office Action, IN App. No. 201717035376, dated Apr. 29, 2020, 5 pages.

* cited by examiner

METHOD AND USER EQUIPMENT FOR COMPACTING HARQ FEEDBACK

CROSS-REFERENCE TO RELATED APPLICATIONS

This application is a National stage of International Application No. PCT/CN2016/071183, filed Jan. 18, 2016, which claims priority to International Application No. PCT/CN2015/076317, filed Apr. 10, 2015, which are hereby incorporated by reference.

TECHNICAL FIELD

The present disclosure generally relates to a method, a User Equipment (UE), and a radio network node, in particular, relates to a method, a UE and a radio network node for compacting HARQ feedback in uplink transmission in a wireless communication system.

BACKGROUND

This section introduces aspects that may facilitate better understanding of the present disclosure. Accordingly, the statement of this solution are to be read in this light and are not to be understood as admission about what is in the prior art or what is not in the prior art.

For 3GPP work item Further Evolution Carrier Aggregation (FeCA), up to 32 downlink (DL) carriers shall be supported for downlink transmission. The HARQ feedback (ACK/NACK) for DL data transmission is linearly increased compared to Rel-10 where there are only 5 DL Component Carriers (CC) at most and the resource for transmission of HARQ feedback is reserved for each configured CC. However, the carrier aggregation of FeCA may have up to 32 CCs and it is possible that a few licensed CCs are aggregated with many unlicensed CCs.

The use of LTE Carrier Aggregation (CA), introduced in Rel-10 and enhanced in Rel-11, offers means to increase the peak data rates, system capacity and user experience by aggregating radio resources from multiple carriers that may reside in the same band or different bands and, in the case of inter-band TDD CA, may be configured with different Uplink (UL)/DL configurations. In Rel-12, carrier aggregation between TDD and FDD serving cells is introduced to support UE connecting to them simultaneously.

In Rel-13, LAA (Licensed-Assisted Access) has attracted a lot of interests in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 deployment, will support calls for extending the carrier aggregation framework to support more than 5 carriers. The extension of the CA framework beyond 5 carriers has been approved to be one work item for LTE Rel-13. The objective is to support up to 32 carriers in both UL and DL.

Compared to single-carrier operation, a UE operating with CA has to report HARQ feedback for more than one DL component carriers. Meanwhile, a UE does not have to support DL and UL CA simultaneously. For instance, the first release of CA capable UEs in the market only supports DL CA but not UL CA. This is also the underlying assumption in the 3GPP RAN4 standardization. Therefore, an enhanced UL control channel, i.e. PUCCH format 3 was introduced for CA during Rel-10 timeframe. However, in order to support more DL component carriers in Rel-13 for those UE not support UL CA, the UL control channel capacity becomes a limitation.

According to current HARQ protocol, ACK/NACK shall be reported for each downlink data transmission. For FDD, there are up to 64 HARQ ACK/NACK bits at one time (Rank>=2) for up to 32 DL CC, depending on the number of configured DL CCs. For TDD, the number of HARQ-ACK/NACK bits depends on the number of configured CCs and UUDL subframe configuration of the DL CCs. Assuming that there are 32 DL CCs with UUDL subframe configuration 2 and transmission mode 3, there are up to 256 (32*4*2) HARQ ACK/NACK bits. Assuming that ½ coding rate and QPSK modulation are applied, in FDD scenario, it needs 32 REs (assuming that spatial bundling is applied) at least, while in TDD scenario, it needs 128 REs (assuming that spatial bundling is applied) at least.

For FeCA, ideally up to 32 CCs can be configured for one UE. But it is less likely that all of the DL CCs are available for one UE due to a number of reasons, for example: within the up to 32 CCs, there may be a huge number of unlicensed CCs which are shared between different networks, for instance, the unlicensed carrier over 5 GHz band can be shared by co-existing WiFi networks and multiple co-existing LTE networks; or there are many users served by the same cell and the carrier resources shall be divided between the served users; or one FeCA capable user may need less than the configured CC sometimes due to the traffic variations.

As mentioned above, unlicensed CCs are shared between multiple operators and sparsely scheduled CCs for one UE can be the frequent case. According to the existing mechanism for transmission of HARQ feedback, the UE needs to reserve the resource for each configured CCs, and this may result in unendurable overhead for transmission of HARQ feedback.

SUMMARY

In order to solve at least part of the above mentioned problems, various embodiments of the present disclosure provide solutions for providing HARQ feedback in a resource efficient way. Other features and advantages of embodiments of the present disclosure will also be understood from the following description of specific embodiments when read in conjunction with the accompanying drawings, which illustrate the principles of embodiments of the present disclosure.

In a first aspect, a method for operating in a User Equipment (UE) for compacting HARQ feedback transmission in uplink in a wireless communication system is provided. The method may comprise step of receiving assisting information indicating arrangement of scheduled downlink transmissions from a radio network node. The method may further comprise the step of determining number and order of the HARQ feedback bits based on the assisting information. The method may further comprise the step of transmitting the HARQ feedback in a compacted manner of reduced padding bits based on the number and order of the HARQ feedback bits to the radio network node.

In an embodiment, the assisting information may be at least one of a Downlink Assignment Index (DAI) and a scheduling indicator.

In another embodiment, the assisting information may be an index of scheduled component carrier and subframe in TDD downlink transmission, or an index of scheduled component carrier in FDD downlink transmission.

In another embodiment, the method may further comprise the step of receiving a configuration for selecting channel format for HARQ feedback transmission from the radio network node via a Radio Resource Control (RRC) signaling.

In yet another embodiment, the method may further comprise the step of selecting the channel format for the HARQ feedback transmission based on payload size of the HARQ feedback.

In another embodiment, the step of transmitting the HARQ feedback may further comprise transmitting other types of feedback information together with the HARQ feedback.

In yet another embodiment, the other types of feedback information may comprise at least one of channel measurement report and scheduling request.

In yet another embodiment, the step of selecting the channel format for HARQ feedback transmission may further comprise selecting the channel format for HARQ feedback transmission based on overall payload size of HARQ feedback and the other types of information.

In an embodiment, the step of transmitting the HARQ feedback may further comprise using at least one of a lower coding rate and a lower transmission power for a channel with large capacity, or using at least one of a higher coding rate and a higher transmission power for a channel with small capacity.

In a second aspect, a method for operating in a radio network node for compacting HARQ feedback transmission in uplink in a wireless communication system is provided. The method may comprise the step of transmitting assisting information indicating scheduled downlink transmissions to a User Equipment (UE). The method may further comprise the step of receiving the HARQ feedback in a compacted manner of reduced padding bits based on number and order of the HARQ feedback bits from the UE. The number and order of the HARQ feedback bits may be determined based on the assisting information by the UE.

In an embodiment, the assisting information may be at least one of a Downlink Assignment Index (DAI) and a scheduling indicator.

In another embodiment, the assisting information may be an index of scheduled component carrier and subframe in TDD downlink transmission, or an index of scheduled component carrier in FDD downlink transmission.

In an embodiment, the method may further comprise the step of transmitting a configuration for selecting channel format for HARQ feedback transmission to the UE via a Radio Resource Control (RRC) signaling.

In another embodiment, the channel format for the HARQ feedback transmission may be selected based on payload size of the HARQ feedback.

In an embodiment, the step of receiving the HARQ feedback may further comprise receiving other types of feedback information together with the HARQ feedback.

In another embodiment, the other types of feedback information may comprise at least one of channel measurement report and scheduling request.

In yet another embodiment, the channel format for HARQ feedback transmission may be selected based on overall payload size of HARQ feedback and the other types of information.

In an embodiment, for the received HARQ feedback, at least one of a lower coding rate and a lower transmission power may be used in a channel with large capacity, or at least one of a higher coding rate and a higher transmission power may be used in a channel with small capacity.

In a third aspect, a User Equipment (UE) for compacting HARQ feedback transmission in uplink in a wireless communication system is provided. The UE may comprise receiving unit configured to receive assisting information indicating scheduled downlink transmissions from a radio network node. The UE may further comprise determining unit configured to determine number and order of HARQ feedback bits based on the assisting information. The UE may further comprise transmitting unit configured to transmit the HARQ feedback in a compacted manner of reduced padding bits based on the number and order of the HARQ feedback bits to the radio network node.

In a fourth aspect, a radio network node for compacting HARQ feedback transmission in uplink in a wireless communication system is provided. The radio network node may comprise transmitting unit configured to transmit assisting information indicating scheduled of downlink transmissions to a User Equipment (UE). The radio network node may further comprise receiving unit configured to receive the HARQ feedback in a compacted manner of reduced padding bits based on number and order of HARQ feedback bits from the UE. The number and order of the HARQ feedback bits may be determined based on the assisting information by the UE.

In a fifth aspect, a User Equipment (UE) for compacting HARQ feedback transmission in uplink in a wireless communication system is provided. The UE comprises memory and processor adapted to perform the method according to the first aspect of present disclosure.

In a sixth aspect, a radio network node for compacting HARQ feedback transmission in uplink in a wireless communication system is provided. The radio network node comprises memory and processor adapted to perform the method according to the second aspect of present disclosure.

In a seventh aspect, a computer program product is provided. The computer program product comprises instructions which, when executed on at least one processor, cause the at least one processor to carry out the method according to the first and second aspect of present disclosure.

It shall be appreciated that various embodiments of the first aspect may also be equally applied to the third, fifth, seventh aspect of the present disclosure, while various embodiments of the second aspect may also be equally applied to the fourth, sixth, seventh aspect of the present disclosure.

BRIEF DESCRIPTION OF THE DRAWINGS

The above and other objects, features and advantages will be more apparent from the following description of embodiments with reference to the figures, in which.

DETAILED DESCRIPTION

Figure 1:
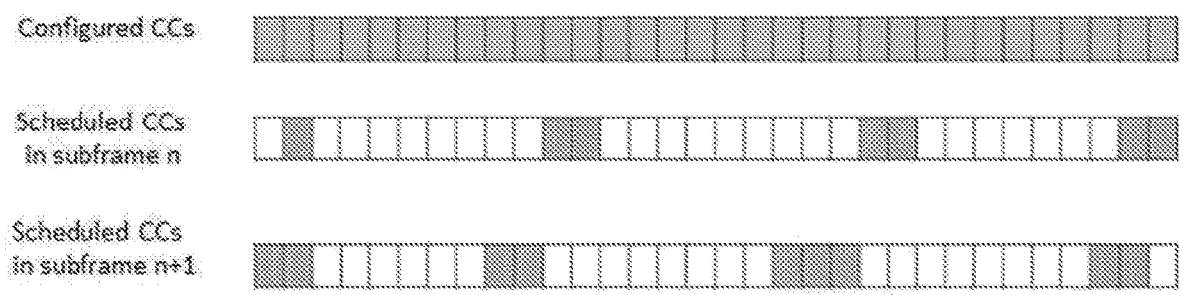
FIG. 1 is a schematic diagram showing an example of sparse scheduling, which can be improved through various embodiments of present disclosure.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment", "another embodiment", etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure or characteristic in connection with other embodiments whether or not explicitly described.

The terminology used herein is for the purpose of describing particular embodiments only and is not intended to limit the embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components and/or combinations thereof.

In the following description and claims, unless defined otherwise, all technical and scientific terms used herein have the same meaning as commonly understood by one of ordinary skills in the art to which this disclosure belongs. For example, the term "radio network node" used herein may refer to a base station, which may also be referred to as Access Point, Access Node, eNB, eNodeB, NodeB or base transceiver station (BTS) etc. depending on the technology and terminology used, or a central node, like a Radio Network Controller (RNC) depending on technology and terminology used. The term "UE" used herein may refer to any terminal having wireless communication capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communication capabilities, or internet appliances permitting wireless internet access and browsing and the like.

Currently in 3GPP Release 10 Carrier Aggregation (CA), the number of payload bits for HARQ ACK/NACK feedback (hereafter, referred to as HARQ feedback, or HARQ ACK, or HARQ ACK feedback) over Physical Uplink Control Channel (PUCCH) format 3 is determined by the number of configured CCs. The position to place the HARQ ACK bits for a scheduled CC is determined based on the order determined by the CC index. However, for a configured CC which is unscheduled, default padding bits will be still filled in the corresponding position in UCI payload on PUCCH.

FIG. 1 illustrates an example of sparse scheduling, which can be further improved by one or more embodiments of present disclosure. As shown in FIG. 1, only a fraction of the configured CCs are scheduled for the UE in subframes n and n+1. One more factor is that there may be limited UL CCs to support up to 32 DL CCs. Therefore, it is desired to have a more efficient way to provide HARQ feedback for the downlink transmission in both TDD and FDD.

Figure 2A:
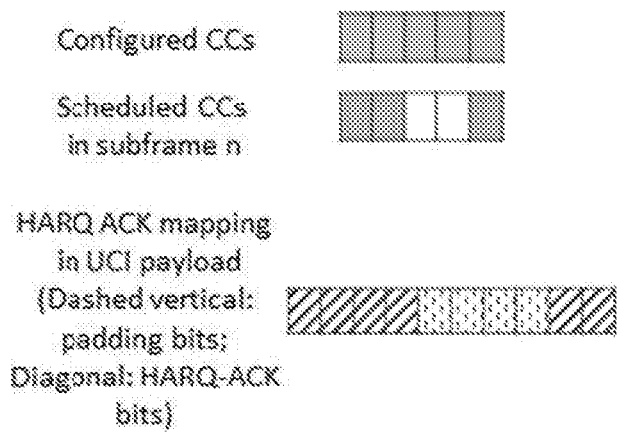
FIGS. 2a and 2b are schematic diagrams showing examples of HARQ ACK bits mapping in UCI payload in FDD mode and TDD mode, respectively.
Figure 2B:
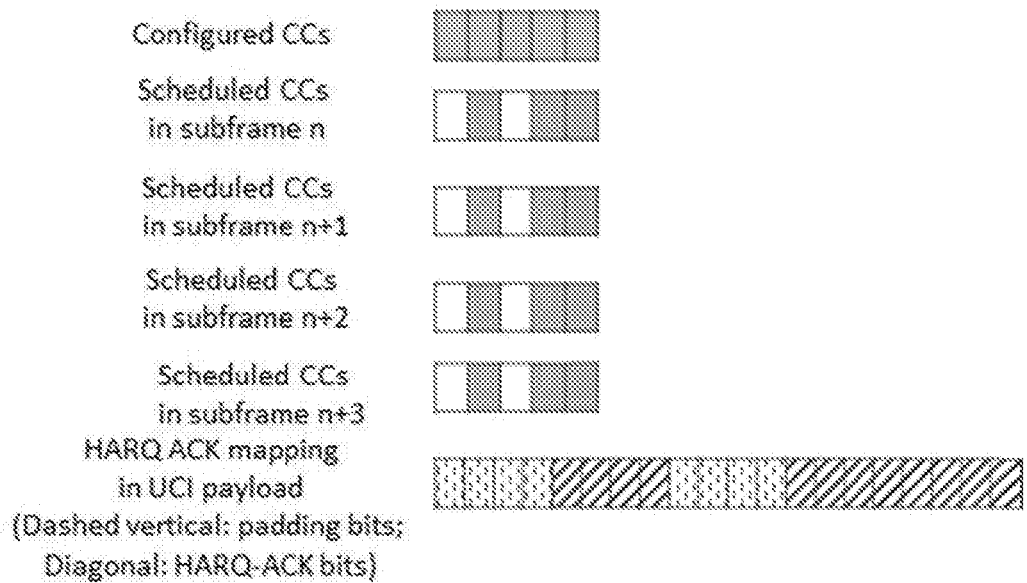
Figure 3:
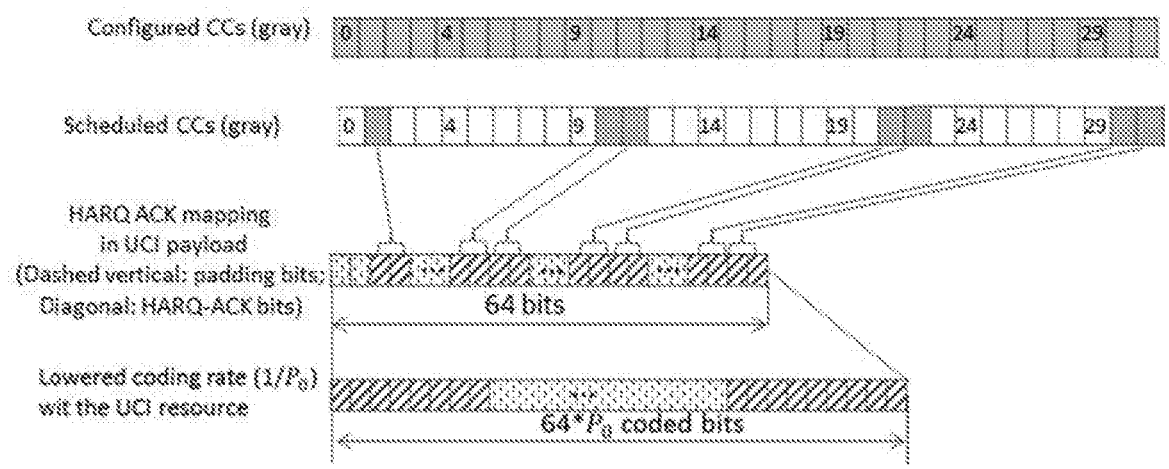
FIG. 3 is a schematic diagram showing an example of configured and scheduled CCs, and UCI mapping example for HARQ feedback for a UE in FDD mode.

FIGS. 2a and 2b are schematic diagrams showing examples of HARQ ACK bits mapping in UCI payload in FDD mode and TDD mode, respectively. In FIG. 2(a), there are only 3 CCs in subframe n are scheduled for downlink transmission, but the padding bits (columns with dashed vertical) are added for the configured but unscheduled CCs together with the HARQ ACK bits (columns with diagonal lines) in UCI payload in FDD mode. In FIG. 2(b), 3 CCs are scheduled in each of subframes n, n+1, n+2, n+3 for downlink transmission, but the padding bits (columns with dashed vertical) are added for the configured but unscheduled CCs together with the HARQ ACK bits (columns with diagonal lines) in UCI payload in TDD mode.

For 3GPP Release 10 with up to 5 CCs, the padding bits due to some configured but unscheduled CCs for one UE could be accepted in statistics because: 1) the number of CCs is much fewer compared to up to 32 CCs in FeCA; and 2) the CC availability in Release 10 is not problematic since all the CCs are licensed CCs. However, for the HARQ feedback for up to 32 CCs, if padding bits are added for all configured CCs, the feedback load will be very heavy for uplink especially in supporting 32 DL CCs with only one uplink CC. Moreover, considering that most CCs may be unlicensed CCs, sparse scheduling may be usual in practice. The HACK ACK bits mapping in UCI payload with the similar mapping rules as in Release 10 may not be acceptable due to the unendurably high ratio of padding bits.

FIG. 3 is a schematic diagram showing an example of configured and scheduled CCs, and UCI mapping example for HARQ feedback for a UE in FDD mode. FIG. 3 illustrates one example (FDD) where only 7 DL CCs are scheduled for one UE among 32 configured DL CCs for the UE. The ratio of padding bits load to HARQ ACK bits load is 50:14. Similar problem also exists for TDD case, example figure of which is omitted here for simplification.

The present disclosure proposes methods to realize compact HARQ feedback in uplink transmission, for example by involving the assisting information indicating the scheduled downlink transmissions (for example, number and order of scheduled CCs in FDD, number and order of scheduled CCs and subframes in TDD) to reduce the padding bits transmission in HARQ feedback so that the radio resource consumption (TX power and/or time-frequency resources) for HARQ ACK feedback can be reduced.

More specifically, User Equipment (UE) receives assisting information (e.g. the Downlink Assignment Index (DAI), or scheduling indicator) from the radio network node (e.g. eNB), which can be used to determine the number of effective HARQ ACK bits and the order to place the HARQ ACK bits, based on both of which the padding bits can be reduced or removed.

According to the compact HARQ ACK bits, the technical effects to reduce radio resource consumption can be achieved and further, for example, by reducing the TX power using lower coding rate with the same channel; and/or reducing the time, and/or frequency, and/or code domain radio resource for the UCI with reduced HARQ ACK bits (which may further mean that the UE may reselect the UCI channel for the UCI with reduced HARQ ACK bits); and/or transmitting more other types of information together in UCI.

In the following, the embodiments are described in detail with the example of FDD. The general rules and procedures are equally applicable for UCI transmission (for example, HARQ feedback transmission, or transmission for HARQ feedback together with other types of information) over PUCCH and/or PUSCH and for both FDD and TDD.

According to an embodiment, it can be predefined or configured that certain assisting information can be used by the UE to identify the scheduled downlink transmissions and according to which, the number and order of HARQ feedback bits can be determined, so that the HARQ feedback can be placed in the UCI in a compact style (i.e. without padding bits due to unscheduled but configured CCs).

Figure 4:
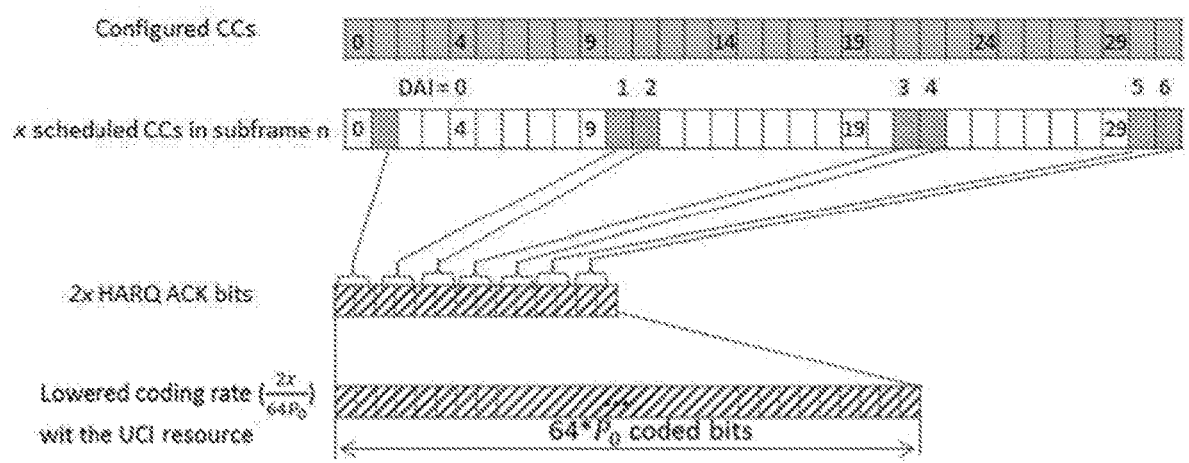
FIG. 4 is a schematic diagram showing an example of compact HARQ ACK feedback in FDD mode according to an embodiment of present disclosure.

According to another embodiment, the assisting information can be Downlink Assignment Index (DAI). For each scheduling command for DL scheduling, one DAI is carried. Based on the predefined rule, the UE can place the HARQ ACK bits according to DAI ascending or descending order, meanwhile the eNB can also derive the mapping between the decoded HARQ ACK bits and the corresponding transmitted data blocks according to the assisting information (for example, DAI). FIG. 4 is a schematic diagram showing an example of compact HARQ ACK feedback in FDD mode according to an embodiment of present disclosure. In FIG. 4, from the DAI information, both the UE and the eNB know that there are in total 14 HARQ ACK bits (i.e. x=7, 7 scheduled CCs). Thus, compact HARQ ACK placement can be applied in UCI feedback.

According to another embodiment, the assisting information can be the scheduling indicator (the scheduling indicator can be used to indicate the UE which CCs are scheduled for the UE). For instance, when the scheduling indicator is transmitted to indicate the scheduled DL CCs for one UE, the UE can determine the number and order of the HARQ feedback bits for the DL transmission according to the ascending or descending order of the scheduled CC index. As an instance, in FIG. 4, by receiving the scheduling indicator with a 32-bit bitmap, the UE is informed that there are 7 DL CCs scheduled for the UE and further determines that there are 14 HARQ ACK bits in total.

According to another embodiment, the compact HARQ feedback can be transmitted over the channel with large capacity by using lower coding rate and/or reduced transmission power. As shown in FIG. 4, the compact HARQ feedback of 14 bits is coded into 64 $P_0$ bits. Compared to FIG. 3, the coding gain is significantly increased so that less transmission power can be applied.

According to another embodiment, channels of different capacities for compact HARQ feedback can be predefined and the channel used for the compact HARQ feedback transmission can be adaptively selected based on predefined configurations. For example, a channel with smaller channel capacity can be selected for compact HARQ feedback with fewer bits.

Table 1 below gives one example of mapping between payload size of HARQ feedback and the channel formats. For instance, Channel format A can be the current UCI Format 3 channel (up to 20 HARQ ACK bits), Channel format B can be a new UCI channel with large capacity (e.g., up to 40 HARQ ACK bits) and Channel format C can be another new UCI channel (up to 64 HARQ ACK bits). There could be even more channel formats, especially for TDD system in which the maximum number of HARQ ACK bits is much larger than that in the FDD system.

TABLE 1

Example of mapping between the number of compact HARQ ACK bits and the channel types (FDD)

| | |
|---|---|
| $N_{Harq} \leq X_1$ | Channel format A (with small capacity) |
| $(N_{Harq} \geq X_1)$ && $(N_{Harq} \leq X_2)$ | Channel format B (with medium capacity) |
| $(N_{Harq} \geq X_1)$ && $(N_{Harq} \leq 64)$ | Channel format C (with large capacity) |

In Table 1, $N_{Harq}$ is the number of compact HARQ ACK bits; $X_1$ is the threshold of low capacity channel (Channel format A) for HARQ feedback; and $X_2$ ($X_2 > X_1$) is the threshold of high capacity channel (Channel format C) for HARQ feedback. It is only a way of showing examples and not intended to limit the present disclosure to the specific example, and those skilled in the art can well observes that there are similar ways of configuring channel formats by also considering other factors together with the payload size of HARQ feedback described herein. It also can be appreciated by those skilled in the art that the channel formats can also be selected based on the overall payload size of HARQ feedback and other types of information that might be sent together with HARQ feedback.

Figure 5:
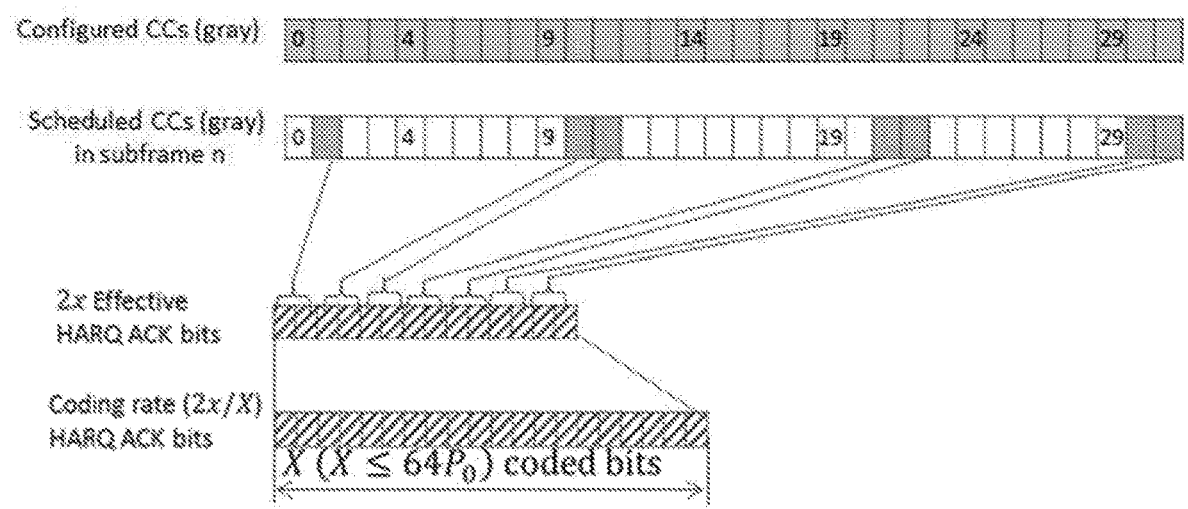
FIG. 5 is a schematic diagram showing an example of channel coding for a selected channel format in FDD mode according to an embodiment of present disclosure.

FIG. 5 is a schematic diagram showing an example of channel coding for a selected channel format in FDD mode according to an embodiment of present disclosure. A mapping table between the size of HARQ feedback and the channel format can be predefined and both the UE and its serving eNB can determine which channel to be used according to the mapping table. Compared to FIG. 3, both power and time-frequency resources can be saved due to the compact HARQ feedback and the proper channel selection according to the compact HARQ feedback.

Figure 6:
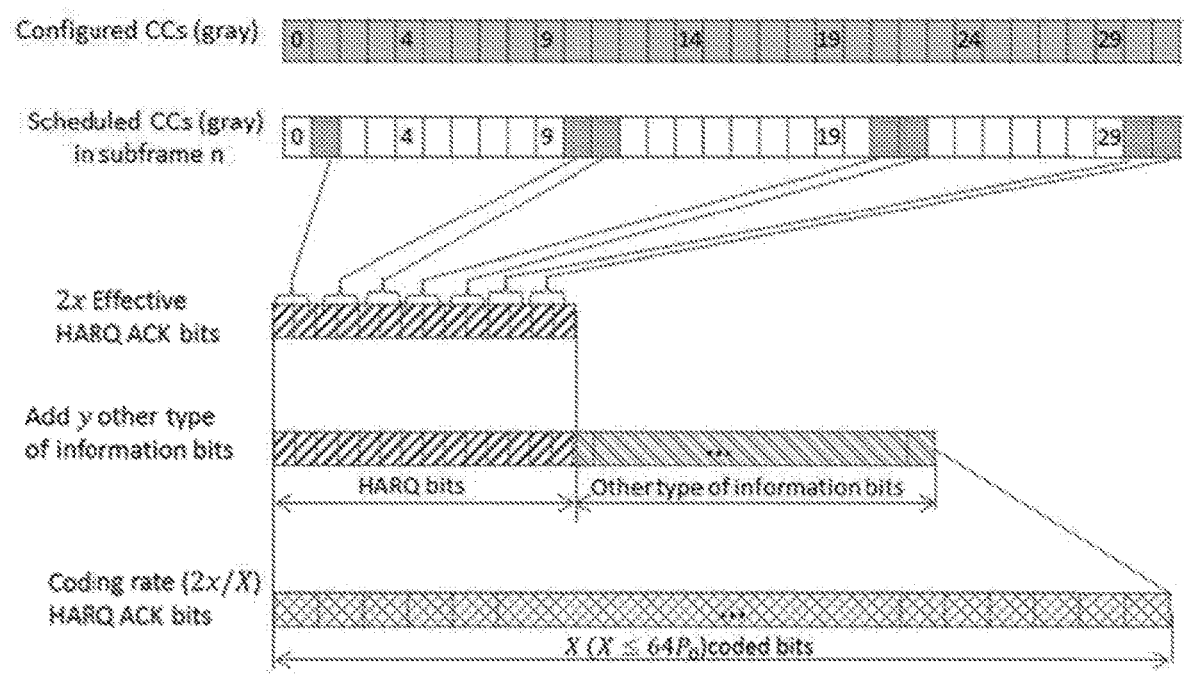
FIG. 6 is a schematic diagram showing other types of information transmitted together with a compact HARQ ACK feedback according to an embodiment of present disclosure.

According to another embodiment, the saved channel capacity by compacting the HARQ feedback can be used for transmission of other types of information, such as channel measurement report, scheduling request, etc. In FIG. 6, other types of information are filled into the UCI payload together with the compact HARQ feedback. The channel capacity is kept unchanged but the channel capacity is more efficiently used compared to FIG. 3. In such a situation, the channel format can be selected by also considering the payload size of other types information together with the size of HARQ feedback.

According to another embodiment, the eNB can transmit which configurations above shall be applied for the UE for transmission of compact HARQ feedback via Radio Resource Control (RRC) signaling.

By adopting the embodiments described herein, at least one of the following benefits could be achieved: (1) Reduce the padding bits caused by unscheduled configured CCs in FeCA cases; (2) Reduce the TX power consumption for UCI transmission; (3) Save the time/frequency/code domain radio resources for UCI transmission; and/or (4) Improve the robustness of the UCI transmission.

Figure 7:
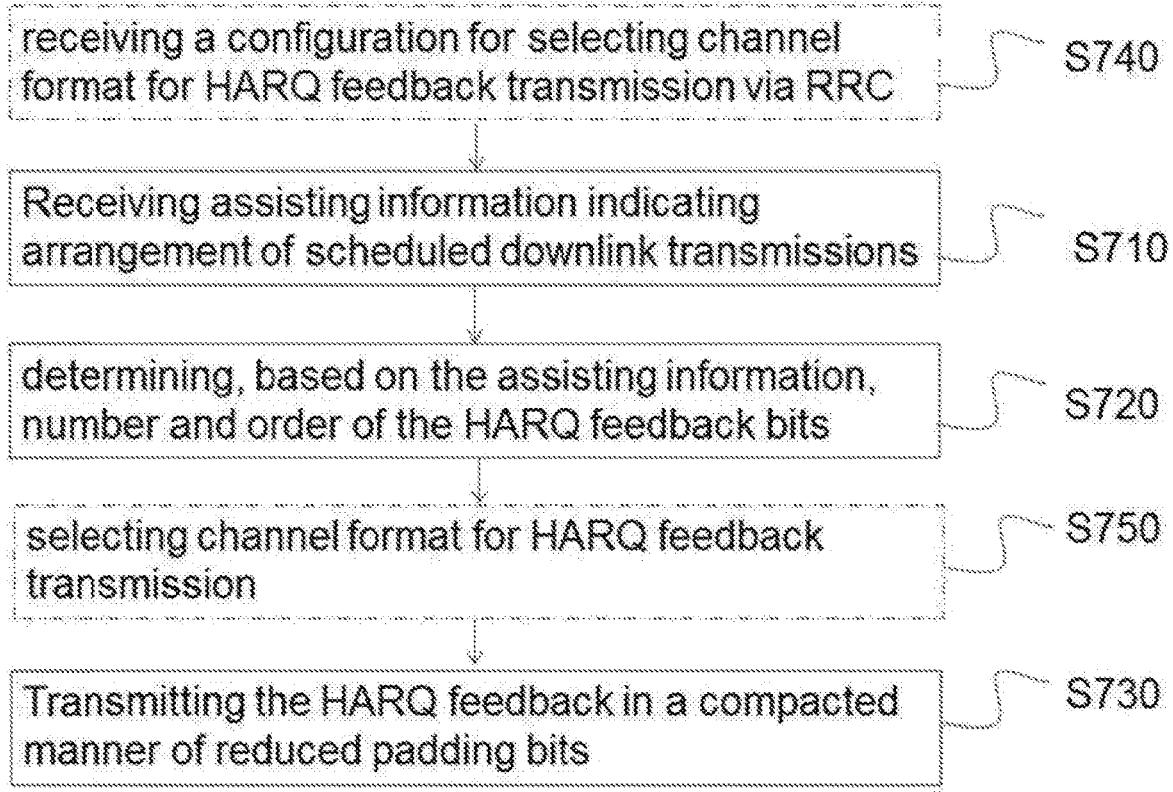
FIG. 7 is a flowchart illustrating a method for compacting HARQ feedback transmission in uplink for a UE in a wireless communication system according to an embodiment of the present disclosure.

FIG. 7 is a flowchart illustrating a method 700 for compacting HARQ feedback transmission in uplink for a UE in a wireless communication system according to an embodiment of the present disclosure.

At step S710, assisting information indicating arrangement of scheduled downlink transmissions (for example, number and order of scheduled CCs in FDD, or number and order of scheduled CCs and subframes in TDD) is received from a radio network node. In an additional or alternative embodiment, the assisting information may be, among others, at least one of a Downlink Assignment Index (DAI) and a scheduling indicator. In an additional or alternative embodiment, the assisting information may be an index of scheduled component carrier and subframe in TDD downlink transmission, or an index of scheduled component carrier in FDD downlink transmission.

At step S720, number and order of the HARQ feedback bits are determined based on the assisting information. At step S730, the HARQ feedback is transmitted to the radio network node in a compacted manner of reduced padding bits based on the number and order of the HARQ feedback bits.

In an alternative embodiment, other types of information are transmitted together with the HARQ feedback to the radio network node. In another embodiment, the other types of feedback information may comprise, among others, channel measurement report and/or scheduling request.

In an alternative or additional embodiment, the method 700 may further comprise step S740. At step S740, a configuration for selecting channel format for HARQ feedback transmission is received from the radio network node via RRC signaling. Those skilled in the art should understand that step S740 is an independent step which is not relying on any steps that mentioned above from S710 to S730. For example, step S740 can be performed prior to step S710, or can be performed when setting up the session between the radio network node and the UE. The sequences for the steps in FIG. 7 are only showing a way of example and are not intended to limit the scope of present disclosure.

In an embodiment, the method may further comprise step S750. At step S750, the channel format for HARQ feedback transmission may be selected based on payload size of the HARQ feedback. In an alternative or additional embodiment, at step S750, the channel format for HARQ feedback transmission may be selected based on overall size of HARQ feedback and the other types of information. The channel format selection can be performed by UE as the embodiment described by referring to FIG. 7, or the radio network node, and in the situation of performing by radio network node, the selected channel format may be received from the radio network node.

In an alternative or additional embodiment, a lower coding rate and/or a lower transmission power in a channel with large capacity may be used for transmitting the HARQ feedback and/or other types of information, and a higher coding rate and/or a higher transmission power in a channel with small capacity may be used for transmitting the HARQ feedback and/or other types of information.

Figure 8:
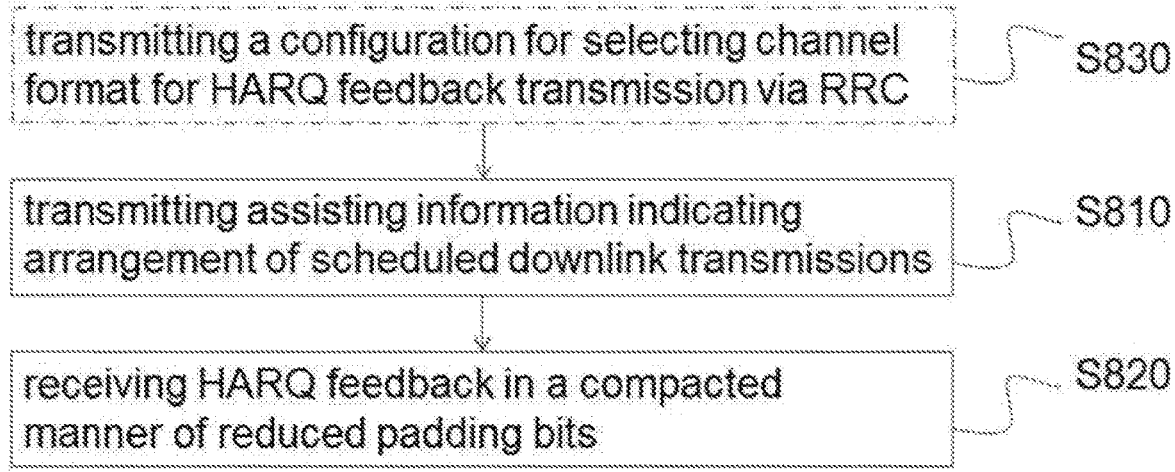
FIG. 8 is a flowchart illustrating a method for compacting HARQ feedback transmission in uplink for a radio network node in a wireless communication system according to an embodiment of the present disclosure.

FIG. 8 is a flowchart illustrating a method 800 for compacting HARQ feedback transmission in uplink for a radio network node in a wireless communication system according to an embodiment of the present disclosure.

At step S810, assisting information indicating arrangement of scheduled downlink transmissions (for example, number and order of scheduled CCs in FDD, or number and order of scheduled CCs and subframes in TDD) is transmitted to a User Equipment (UE). In an embodiment, the assisting information can be, among others, at least one of a Downlink Assignment Index (DAI) and a scheduling indicator. In an additional or alternative embodiment, the assisting information can be an index of scheduled component carrier and subframe in TDD downlink transmission, or an index of scheduled component carrier in FDD downlink transmission.

At step S820, the HARQ feedback is received from the UE in a compacted manner of reduced padding bits based on number and order of the HARQ feedback bits. The number and order of the HARQ feedback bits is determined based on the assisting information by the UE.

In an embodiment, at step S820, other types of information are received together with the HARQ feedback. In an additional or alternative embodiment, the other types of feedback information may comprise, among others, channel measurement report and/or scheduling request.

In another embodiment, the method 800 may further comprise step S830. At step S830, a configuration for selecting channel format for HARQ feedback transmission is transmitted to the UE via RRC signaling. Similarly, those skilled in the art should understand that step S830 is an independent step which is not relying on any steps that mentioned above from S810 and S820. For example, step S830 can be performed prior to step S810, or can be performed when setting up the session between the radio network node and the UE. The sequences for the steps in FIG. 8 are only showing a way of example and are not intended to limit the scope of present disclosure.

In an additional or alternative embodiment, the channel format for HARQ feedback transmission is selected based on payload size of HARQ feedback. In an additional or alternative embodiment, the channel format for HARQ feedback transmission is selected based on overall payload size of HARQ feedback and the other types of information. As mentioned above, the channel format selection may be performed by the UE or the radio network node, and in the situation of performing by radio network node, the selected channel format may be transmitted to the UE.

In an embodiment, a lower coding rate and/or a lower transmission power in a channel with large capacity may be used for the received the HARQ feedback and/or other types of information, and a higher coding rate and/or a higher transmission power in a channel with small capacity may be used for the received the HARQ feedback and/or other types of information.

Figure 9:
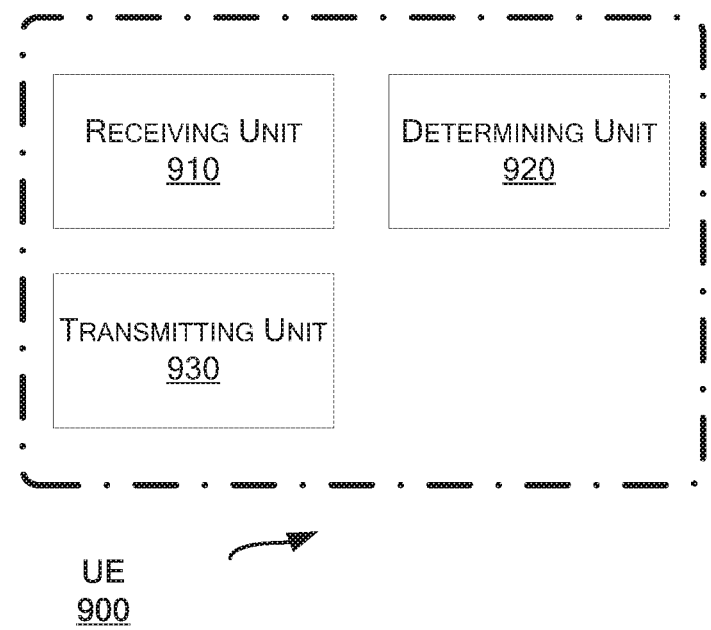
FIG. 9 is a block diagram of a UE according to an embodiment of the present disclosure.

Correspondingly to the method 700 as described above, a UE is provided. FIG. 9 is a block diagram of a UE 900 for compacting HARQ feedback transmission in uplink in a wireless communication system according to an embodiment of the present disclosure.

As shown in FIG. 9, the UE 900 includes a receiving unit 910 configured to receive, from a radio network node, an assisting information indicating arrangement of scheduled downlink transmissions (for example, number and order of scheduled CCs in FDD, or number and order of scheduled CCs and subframes in TDD). In an embodiment, the assisting information can be at least one of a Downlink Assignment Index (DAI) and a scheduling indicator. In an additional or alternative embodiment, the assisting information may be an index of scheduled component carrier and subframe in TDD downlink transmission, or an index of scheduled component carrier in FDD downlink transmission.

The UE 900 further includes a determining unit 920 configured to determine, based on the assisting information, number and order of HARQ feedback bits. The UE 900 further includes a transmitting unit 930 configured to transmit, to the radio network node, the HARQ feedback in a compacted manner of reduced padding bits based on the determined number and order of the HARQ feedback bits.

In an embodiment, other types of information are transmitted together with the HARQ feedback by transmitting unit 930. In an additional or alternative embodiment, the other types of feedback information may comprise, among others, channel measurement report and/or scheduling request.

In an embodiment, the receiving unit 910 may be further configured to receive, a configuration for selecting channel format for HARQ feedback transmission from the radio network node via RRC signaling. In an additional or alternative embodiment, the transmitting unit 930 may be further configured to select the channel format for HARQ feedback transmission based on payload size of HARQ feedback. In an additional or alternative embodiment, the transmitting unit 930 may further configured to select the channel format for HARQ feedback transmission i based on overall payload size of HARQ feedback and the other types of information. In an embodiment, the channel format selection may be performed by the radio network node, and in the situation of performing by radio network node, the receiving unit 910 may be further configured to receive channel format that has been selected by the radio network node.

In an embodiment, a lower coding rate and/or a lower transmission power in a channel with large capacity may be used for transmitting the HARQ feedback and/or other types of information, and a higher coding rate and/or a higher transmission power in a channel with small capacity may be used for transmitting the HARQ feedback and/or other types of information, by the transmitting unit 930.

Each of the units 910-930 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 10:
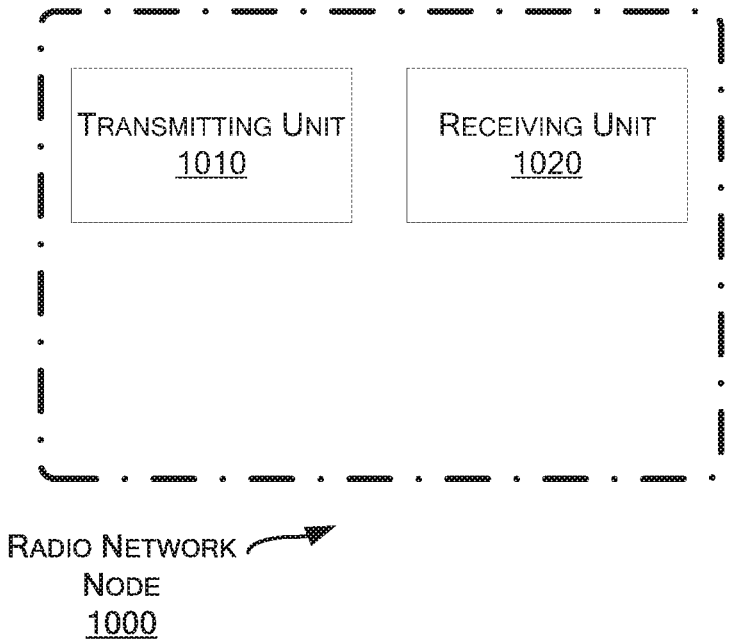
FIG. 10 is a block diagram of a radio network node according to an embodiment of the present disclosure.

Correspondingly to the method 800 as described above, a radio network node is provided. FIG. 10 is a block diagram of a radio network node 1000 for compacting HARQ feedback transmission in uplink in a wireless communication system according to an embodiment of the present disclosure.

As shown in FIG. 10, the radio network node 1000 includes a transmitting unit 1010 configured to transmit, to a User Equipment (UE), assisting information indicating arrangements of scheduled downlink transmissions (for example, number and order of scheduled CCs in FDD, or number and order of scheduled CCs and subframes in TDD). In an embodiment, the assisting information may be, among others, at least one of a Downlink Assignment Index (DAI) and a scheduling indicator. In an additional or alternative embodiment, the assisting information may be an index of scheduled component carrier and subframe in TDD downlink transmission, or an index of scheduled component carrier in FDD downlink transmission.

The radio network node 1000 further includes a receiving unit 1020 configured to receive, from the UE, the HARQ feedback in a compacted manner of reduced padding bits based on number and order of HARQ feedback bits. The number and order of the HARQ feedback bits is determined based on the assisting information by the UE.

In an embodiment, other types of information are received together with the HARQ feedback by the receiving unit 1020. In yet another embodiment, the other types of feedback information may comprise, among others, channel measurement report and/or scheduling request.

In an embodiment, the transmitting unit 1010 may be further configured to transmit, a configuration for selecting channel format for HARQ feedback transmission to the UE. In an additional or alternative embodiment, the channel format for HARQ feedback transmission may be selected based on payload size of HARQ feedback. In an additional or alternative embodiment, the channel format for HARQ feedback transmission is selected based on overall payload size of HARQ feedback and the other types of information. In an embodiment, the channel format selection may be performed by the radio network node, and in the situation of performing by radio network node, the transmitting unit 910 may be further configured to tranmist the selected channel format to UE.

In an embodiment, a lower coding rate and/or a lower transmission power in a channel with large capacity may be used for the received the HARQ feedback and/or other types of information, and a higher coding rate and/or a higher transmission power in a channel with small capacity may be used for the received the HARQ feedback and/or other types of information.

Each of the units 1010-1020 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 8.

Figure 11:
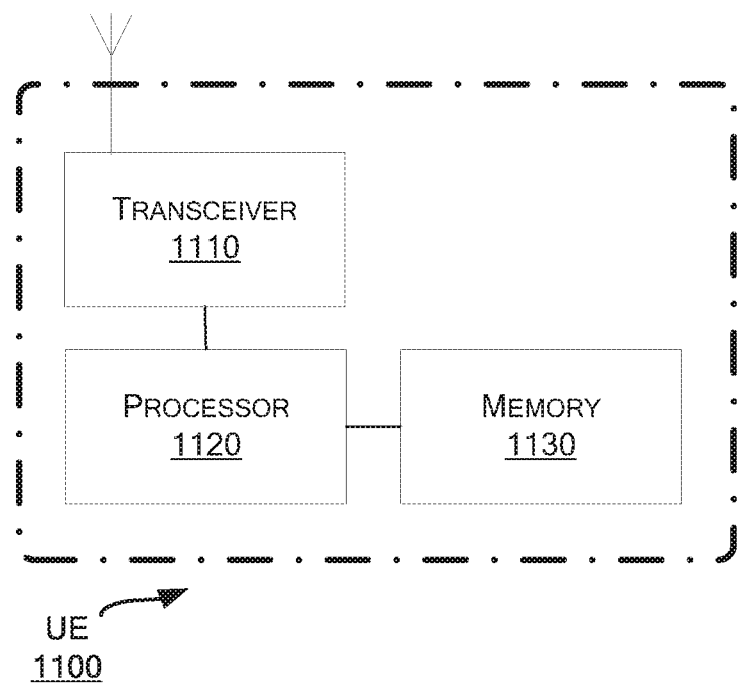
FIG. 11 is a block diagram of a UE according to another embodiment of the present disclosure.

FIG. 11 is a block diagram of a UE 1100 for compacting HARQ feedback transmission in uplink in a wireless communication system according to another embodiment of the present disclosure.

The UE 1100 includes a transceiver 1110, a processor 1120 and a memory 1130. The memory 1130 contains instructions executable by the processor 1120, enable the UE 1100 operate in accordance with the embodiments of present disclosure, for example to perform the method 700 with reference to FIG. 7. The detailed description will be omitted for simplification.

Figure 12:
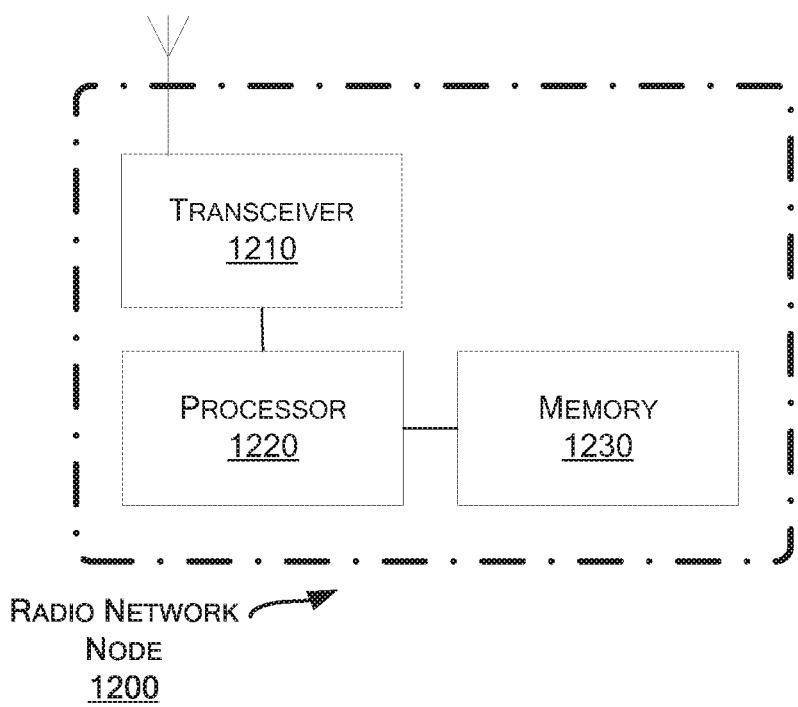
FIG. 12 is a block diagram of a radio network node according to another embodiment of the present disclosure.

FIG. 12 is a block diagram of a radio network node 1200 for compacting HARQ feedback transmission in uplink in a wireless communication system according to another embodiment of the present disclosure.

The radio network node 1200 includes a transceiver 1210, a processor 1220 and a memory 1230. The memory 1230 contains instructions executable by the processor 1220, enable the radio network node 1200 operate in accordance with the embodiments of present disclosure, for example to perform the method 800 with reference to FIG. 8. The detailed description will be omitted for simplification.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 820 causes the network entity 800 to perform the actions, e.g., of the procedure described earlier in conjunction with FIG. 7 or 8.

The computer program product may be configured as a computer program code structured in computer program modules. The computer program modules could essentially perform the actions of the flow illustrated in FIG. 7 or 8.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for operating in a User Equipment (UE) for transmitting HARQ feedback in uplink in a wireless communication system, wherein a plurality of component carriers are configured for the UE for carrier aggregation, comprising:
   receiving, from a radio network node via a Radio Resource Control (RRC) signaling, a configuration for selecting a channel format for a HARQ feedback transmission;
   receiving, from the radio network node, assisting information comprising a scheduling indicator with a bitmap of the plurality of component carriers and indicating one or more scheduled component carriers of the plurality of component carriers configured for the UE;
   determining, based on the bitmap, number and order of HARQ feedback bits required for the one or more scheduled component carriers, the order according to an ascending or descending order of a scheduled component carrier index;
   determining the HARQ feedback transmission based on the determined number and order of the HARQ feedback bits, without including padding bits for unscheduled, but configured, component carriers of the plurality of component carriers;
   determining other types of information to be included together with the HARQ feedback bits in the HARQ feedback transmission;
   selecting a coding rate for the HARQ feedback transmission that includes the HARQ feedback bits and the other types of information;
   selecting the channel format to transmit the HARQ feedback transmission based on the selected coding rate; and
   transmitting, to the radio network node, the HARQ feedback transmission using the selected coding rate and the selected channel format.

2. The method according to claim 1, wherein the other types of information comprise a channel measurement report and a scheduling request.

3. The method according to claim 1, wherein the assisting information further indicates an index of one or more subframes in TDD downlink transmission.

4. The method according to claim 1, wherein the transmitting the HARQ feedback transmission further comprises:
   decreasing the coding rate, when additional capacity is available for a channel for the HARQ feedback transmission or increasing the coding rate for the channel, when capacity is lacking for the HARQ feedback transmission.

5. A method for operating in a radio network node for receiving HARQ feedback transmission in uplink in a wireless communication system, wherein a plurality of component carriers are configured for a User Equipment (UE) for carrier aggregation, comprising:
   transmitting, to the UE, a configuration for selecting a channel format for a HARQ feedback transmission via a Radio Resource Control (RRC) signaling;
   transmitting, to the UE, assisting information comprising a scheduling indicator with a bitmap of the plurality of component carriers and indicating one or more scheduled component carriers of the plurality of component carriers configured for the UE; and
   receiving, from the UE, the HARQ feedback transmission based on number and order of HARQ feedback bits, without inclusion of padding bits for unscheduled, but configured, component carriers of the plurality of component carriers, wherein the order is according to an ascending or descending order of a scheduled component carrier index, and the HARQ feedback transmission including other types of information together with the HARQ feedback bits, wherein the number and order of the HARQ feedback bits required for the one or more scheduled component carriers are determined from the bitmap by the UE and wherein the UE selects a coding rate for the HARQ feedback bits and the other types of information and transmits the HARQ feedback transmission by selecting the channel format based on the selected coding rate.

6. The method according to claim 5, wherein the other types of information comprise a channel measurement report and a scheduling request.

7. The method according to claim 5, wherein the assisting information further indicates an index of one or more subframes in TDD downlink transmission.

8. The method according to claim 5, wherein for the received HARQ feedback transmission, the UE decreases the coding rate for a channel selected, when additional capacity is available for the channel for the HARQ feedback transmission or the UE increases the coding rate for the channel, when capacity is lacking for the HARQ feedback transmission.

9. A User Equipment (UE) for transmitting HARQ feedback in uplink in a wireless communication system, wherein a plurality of component carriers are configured for the UE for carrier aggregation, comprising:
 a processor; and
 a memory containing instructions which, when executed by the processor, cause the UE to perform operations to:
  receive, from a radio network node via a Radio Resource Control (RRC) signaling, a configuration for selecting a channel format for a HARQ feedback transmission;
  receive, from the radio network node, assisting information comprising a scheduling indicator with a bitmap of the plurality of component carriers and indicating one or more scheduled component carriers of the plurality of component carriers configured for the UE;
  determine, based on the bitmap, number and order of HARQ feedback bits required for the one or more scheduled component carriers, the order according to an ascending or descending order of a scheduled component carrier index;
  determine the HARQ feedback transmission based on the determined number and order of the HARQ feedback bits, without including padding bits for unscheduled, but configured, component carriers of the plurality of component carriers;
  determine other types of information to be included together with the HARQ feedback bits in the HARQ feedback transmission;
  select a coding rate for the HARQ feedback transmission that includes the HARQ feedback bits and the other types of information;
  select the channel format to transmit the HARQ feedback transmission based on the selected coding rate; and
  transmit, to the radio network node, the HARQ feedback transmission using the selected coding rate and the selected channel format.

10. The UE according to claim 9, wherein the other types of information comprise a channel measurement report and a scheduling request.

11. The UE according to claim 9, wherein the assisting information further includes an index of one or more subframes in TDD downlink transmission.

12. The UE according to claim 9, wherein the instructions further cause the UE to transmit the HARQ feedback transmission by further performing operations to:
 decrease the coding rate, when additional capacity is available for a channel for the HARQ feedback transmission or increase the coding rate for the channel when capacity is lacking for the HARQ feedback transmission.

13. A radio network node for receiving HARQ feedback transmission in uplink in a wireless communication system, wherein a plurality of component carriers are configured for a User Equipment (UE) for carrier aggregation, comprising:
 a processor; and
 a memory containing instructions which, when executed by the processor, cause the radio network node to perform operations to:
  transmit, to the UE, a configuration for selecting a channel format for a HARQ feedback transmission via a Radio Resource Control (RRC) signaling;
  transmit, to the UE, assisting information comprising a scheduling indicator with a bitmap of the plurality of component carriers and indicating one or more scheduled component carriers of the plurality of component carriers configured for the UE; and
  receive, from the UE, the HARQ feedback transmission based on number and order of HARQ feedback bits, without inclusion of padding bits for unscheduled, but configured, component carriers of the plurality of component carriers, wherein the order is according to an ascending or descending order of a scheduled component carrier index, and the HARQ feedback transmission including other types of information together with the HARQ feedback bits, wherein the number and order of the HARQ feedback bits required for the one or more scheduled component carriers are determined from the bitmap by the UE and wherein the UE selects a coding rate for the HARQ feedback bits and the other types of information and transmits the HARQ feedback transmission by selecting the channel format based on the selected coding rate.

14. The radio network node according to claim 13, wherein the other types of information comprise a channel measurement report and a scheduling request.

15. The radio network node according to claim 13, wherein the assisting information further indicates an index of subframes in TDD downlink transmission.

16. The radio network node according to claim 13, wherein for the received HARQ feedback transmission, the UE decreased the coding rate for a channel selected, when additional capacity was available for the channel for the HARQ feedback transmission or the UE increased the coding rate for the channel, when capacity was lacking for the HARQ feedback transmission.

* * * * *

UNITED STATES PATENT AND TRADEMARK OFFICE
CERTIFICATE OF CORRECTION

PATENT NO. : 10,778,381 B2
APPLICATION NO. : 14/907518
DATED : September 15, 2020
INVENTOR(S) : Liu et al.

Page 1 of 1

It is certified that error appears in the above-identified patent and that said Letters Patent is hereby corrected as shown below:

In the Specification

In Column 2, Line 15, delete "UUDL" and insert -- UL/DL --, therefor.

In Column 2, Line 16, delete "UUDL" and insert -- UL/DL --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*